(12) United States Patent
Shin et al.

(10) Patent No.: US 9,319,574 B2
(45) Date of Patent: Apr. 19, 2016

(54) CAMERA LENS ASSEMBLY

(71) Applicant: Samsung Electronics Co., Ltd., Suwon-si, Gyeonggi-do (KR)

(72) Inventors: Doo-Sik Shin, Suwon-si (KR); Se-Won Kim, Suwon-si (KR); Hyung-Jin Rho, Seoul (KR); Hyun-Ho Yu, Yongin-si (KR); Dong-Ik Jang, Chilgok-gun (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/189,521

(22) Filed: Feb. 25, 2014

(65) Prior Publication Data

US 2014/0362284 A1    Dec. 11, 2014

(30) Foreign Application Priority Data

Jun. 10, 2013  (KR) .................. 10-2013-0065798
Nov. 21, 2013  (KR) .................. 10-2013-0141885

(51) Int. Cl.
*H04N 5/228* (2006.01)
*G03B 17/00* (2006.01)
*H04N 5/225* (2006.01)
*G02B 27/64* (2006.01)

(52) U.S. Cl.
CPC ............ *H04N 5/2254* (2013.01); *G02B 27/646* (2013.01)

(58) Field of Classification Search
CPC ............ H04N 5/2328; H04N 5/23287; H04N 5/23293; H04N 5/23296; H04N 5/2353; H04N 5/23264
USPC ........ 348/208.1, 208.2, 208.4, 208.5, 208.11; 396/296, 55
See application file for complete search history.

(56) References Cited

U.S. PATENT DOCUMENTS

| 7,519,282 B2* | 4/2009 | Shin ..................... G02B 27/646 |
| | | 348/208.4 |
| 2002/0176713 A1 | 11/2002 | Kai et al. |
| 2006/0082658 A1 | 4/2006 | Lee et al. |

(Continued)

FOREIGN PATENT DOCUMENTS

| EP | 2 743 750 A1 | 6/2014 |
| EP | 2 750 371 A1 | 7/2014 |

(Continued)

OTHER PUBLICATIONS

Sankyo, Sankyo OIS presentation, A Nider Group Company, Sankyo, All for Dreams, Semi Humming Bird, Feb. 26, 2013, NIDEC Sankyo Corporation.

*Primary Examiner* — Sinh Tran
*Assistant Examiner* — Xi Wang
(74) *Attorney, Agent, or Firm* — Jefferson IP Law, LLP

(57) ABSTRACT

A camera lens assembly is provided. The camera lens includes a movable Auto Focusing (AF) unit configured to move back and forth in a direction of an optical axis of an image sensor, and a movable Optical Image Stabilization (OIS) unit installed on the movable AF unit and configured to move back and forth in the direction of the optical axis together with the movable AF unit. The movable OIS unit floats in a direction orthogonal to the optical axis on the movable AF unit. The camera lens assembly simplifies the construction while implementing both the auto focus function and the optical image stabilization function. As a result, the camera lens assembly is advantageous for miniaturization and may improve reliability.

18 Claims, 14 Drawing Sheets

(56) References Cited

U.S. PATENT DOCUMENTS

| | | | |
|---|---|---|---|
| 2007/0172220 A1 | 7/2007 | Masuda | |
| 2008/0187301 A1* | 8/2008 | Takahashi | G02B 5/00 396/55 |
| 2009/0303594 A1 | 12/2009 | Lim et al. | |
| 2011/0211821 A1* | 9/2011 | Park | G03B 5/02 396/55 |
| 2011/0267692 A1* | 11/2011 | Watanabe | G03B 5/02 359/557 |
| 2012/0082442 A1 | 4/2012 | Kwon et al. | |
| 2012/0106936 A1* | 5/2012 | Lim | G03B 5/02 396/55 |
| 2012/0154614 A1* | 6/2012 | Moriya et al. | 348/208.5 |
| 2012/0224841 A1* | 9/2012 | Wu et al. | 396/55 |
| 2012/0229901 A1 | 9/2012 | Moriya et al. | |
| 2013/0141799 A1 | 6/2013 | Li et al. | |

FOREIGN PATENT DOCUMENTS

| | | |
|---|---|---|
| JP | 2011-065140 A | 3/2011 |
| KR | 10-2006-0034356 A | 4/2006 |
| KR | 10-2010-0066678 A | 6/2010 |
| KR | 10-2011-0086936 A | 8/2011 |
| KR | 10-2012-0045333 A | 5/2012 |
| KR | 10-2013-0020415 A | 2/2013 |
| KR | 10-2013-0022135 A | 3/2013 |

* cited by examiner

CAMERA LENS ASSEMBLY

CROSS-REFERENCE TO RELATED APPLICATION(S)

This application claims the benefit under 35 U.S.C. §119 (a) of a Korean patent application filed on Jun. 10, 2013 in the Korean Intellectual Property Office and assigned Serial number 10-2013-0065798, and of a Korean patent application filed on Nov. 21, 2013 in the Korean Intellectual Property Office and assigned Serial number 10-2013-0141885, the entire disclosure of each of which is hereby incorporated by reference.

TECHNICAL FIELD

The present disclosure relates to a camera lens assembly. More particularly, the present disclosure relates to a camera lens assembly which implements, for example, an auto focus function and an optical image stabilization function.

BACKGROUND

As digital camera manufacturing technologies have been developed, electronic devices, such as mobile communication terminals, have been equipped with miniaturized and lightened camera lens assemblies and have been commercialized and are gradually encroaching on the compact digital camera market. As a camera lens assembly is equipped in a mobile communication terminal, it has become possible for a user to easily and conveniently use various functions, such as a video call and an augmented reality, as well as to photograph a still or moving picture.

As it has become generalized to equip a camera lens assembly in an electronic device, efforts are concentrated on improving the performance of the camera in areas, such as image quality, while miniaturizing the camera lens assembly. The auto focus function is an example of a technology in need of improvement to better the performance of the camera lens assembly. The auto focus function moves a lens positioned in front of an image sensor in the direction of an optical axis according to a distance to a subject to be photographed so that a clear image may be obtained on an image forming surface of the image sensor. Such an auto focus function has been incorporated in high-priced electronic devices. However, the auto focus function has become an essential function which is incorporated even in low-cost popular electronic devices now.

In addition, the optical image stabilization technology is another technology in need of improvement to better the performance of the camera lens assembly. The optical image stabilization technology is a technology for compensating for the shaking of a subject's image which is caused by the vibrations of a human body, such as hand shaking during photographing. Such optical image stabilization is enabled by detecting vibrations applied to an electronic device, for example, a camera through various angular velocity sensors equipped in the electronic device, and moving the lens or image sensor according to the angular velocity and direction of the detected vibrations.

Therefore, a need exists for a camera lens assembly capable of implementing both an auto focus function and an optical image stabilization function while being formed in a single module shape.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a camera lens assembly capable of implementing both an auto focus function and an optical image stabilization function while being formed in a single module shape.

Another aspect of the present disclosure is to provide a camera lens assembly which may be easily miniaturized while implementing both the auto focus function and the optical image stabilization.

Another aspect of the present disclosure is to provide a camera lens assembly which has a strong structure while implementing both the auto focus function and the optical image stabilization function.

In accordance with an aspect of the present disclosure, a camera lens assembly is provided. The camera lens includes a movable Auto Focusing (AF) unit configured to move back and forth in a direction of an optical axis of an image sensor, and a movable Optical Image Stabilization (OIS) unit installed on the movable AF unit and configured to move back and forth in the direction of the optical axis together with the movable AF unit. The movable OIS unit may float in a direction orthogonal to the optical axis on the movable AF unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following descriptions of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 2:
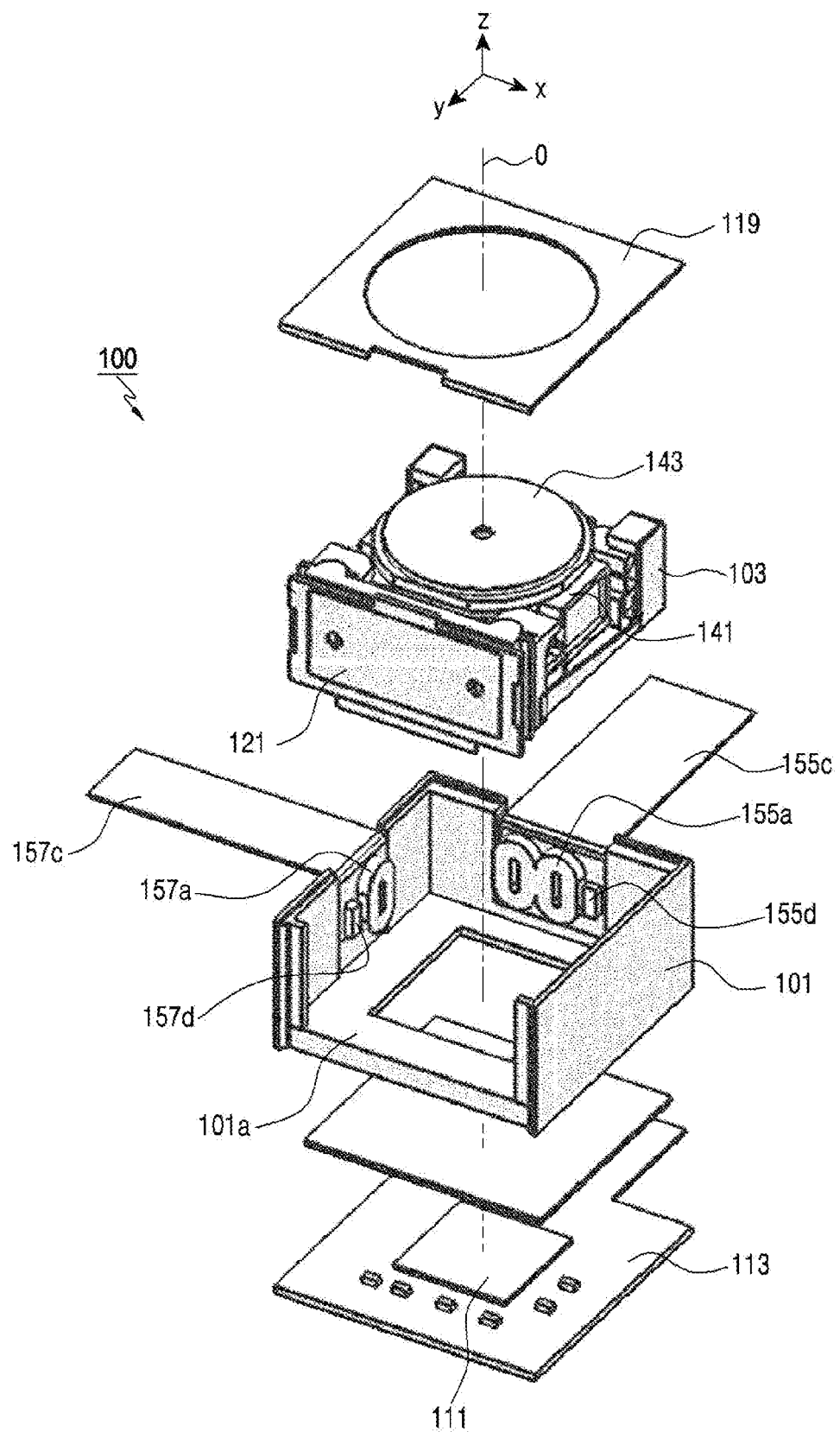
FIG. 2 is a perspective view illustrating a camera lens assembly according to an embodiment of the present disclosure in a partially disassembled state.
Figure 3:
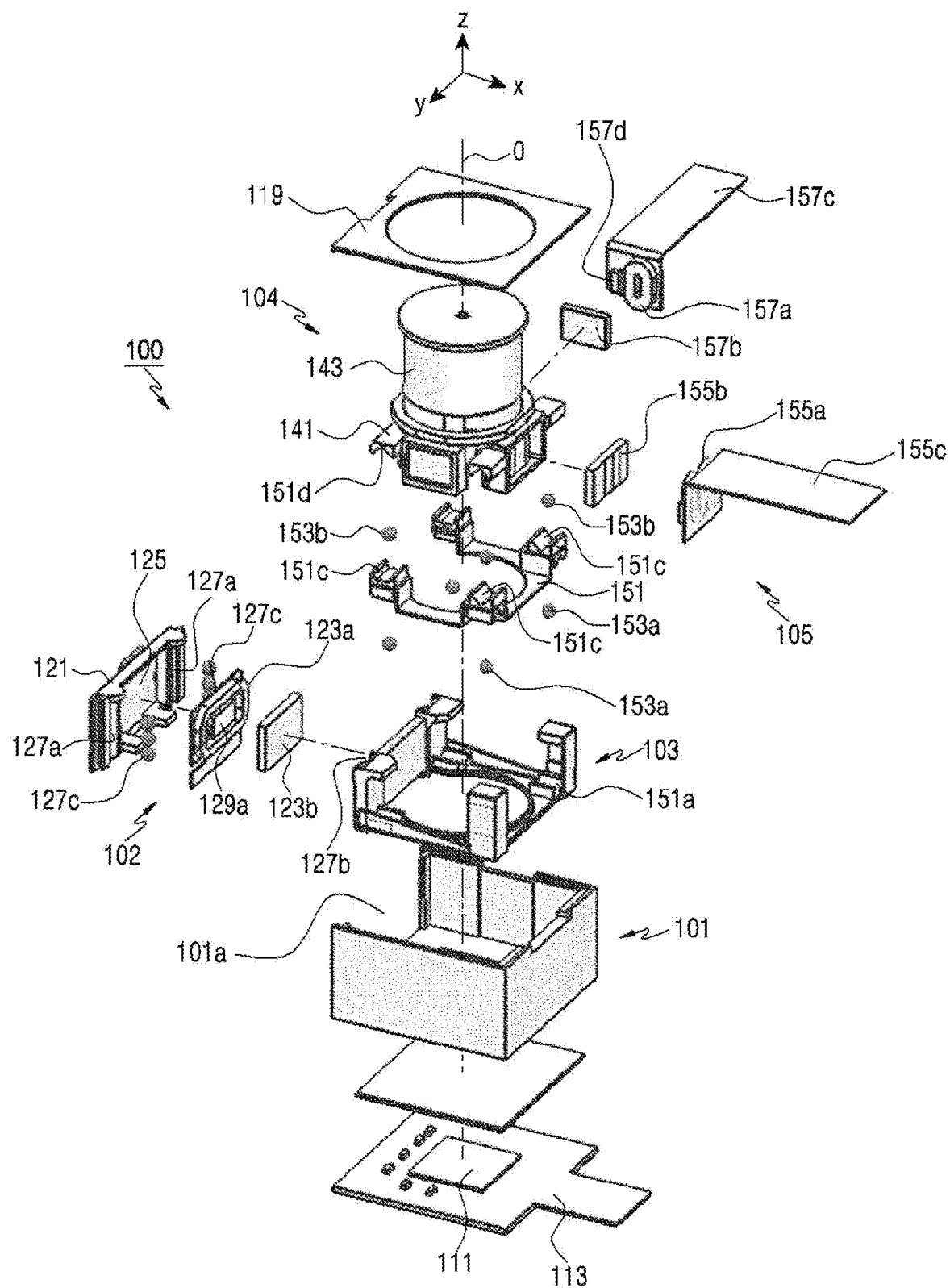
FIG. 3 is an exploded perspective view illustrating a camera lens assembly according to an embodiment of the present disclosure.

FIG. 2 is a perspective view illustrating a camera lens assembly according to an embodiment of the present disclosure in a partially disassembled state. FIG. 3 is an exploded perspective view illustrating a camera lens assembly according to an embodiment of the present disclosure.

Referring to FIGS. 2 and 3, the camera lens assembly according to various embodiment may include a movable Auto Focusing (AF) unit configured to move along the direction of an optical axis O of an image sensor 111, and a movable Optical Image Stabilization (OIS) unit 104 mounted on the movable AF unit and configured to move back and forth in the direction of the optical axis O together with the movable AF unit. The movable OIS unit 104 may compensate for the shaking of a photographed image caused by vibrations applied to the camera lens assembly according to various embodiments of the present disclosure by floating on the movable AF unit in a direction orthogonal to the optical axis O.

The movable AF unit may smoothly move back and forth through a guide structure, for example, a ball bearing structure, provided in the direction of the optical axis O in the camera lens assembly. The movable OIS unit 104 may also smoothly float in a plane orthogonal to the optical axis through a guide structure, for example, a ball bearing structure or a wire support structure, provided on the movable AF unit. The driving force, which causes the movable AF unit and the movable OIS unit 104 to move back and forth or to float, may be provided by a voice coil motor.

Figure 1:
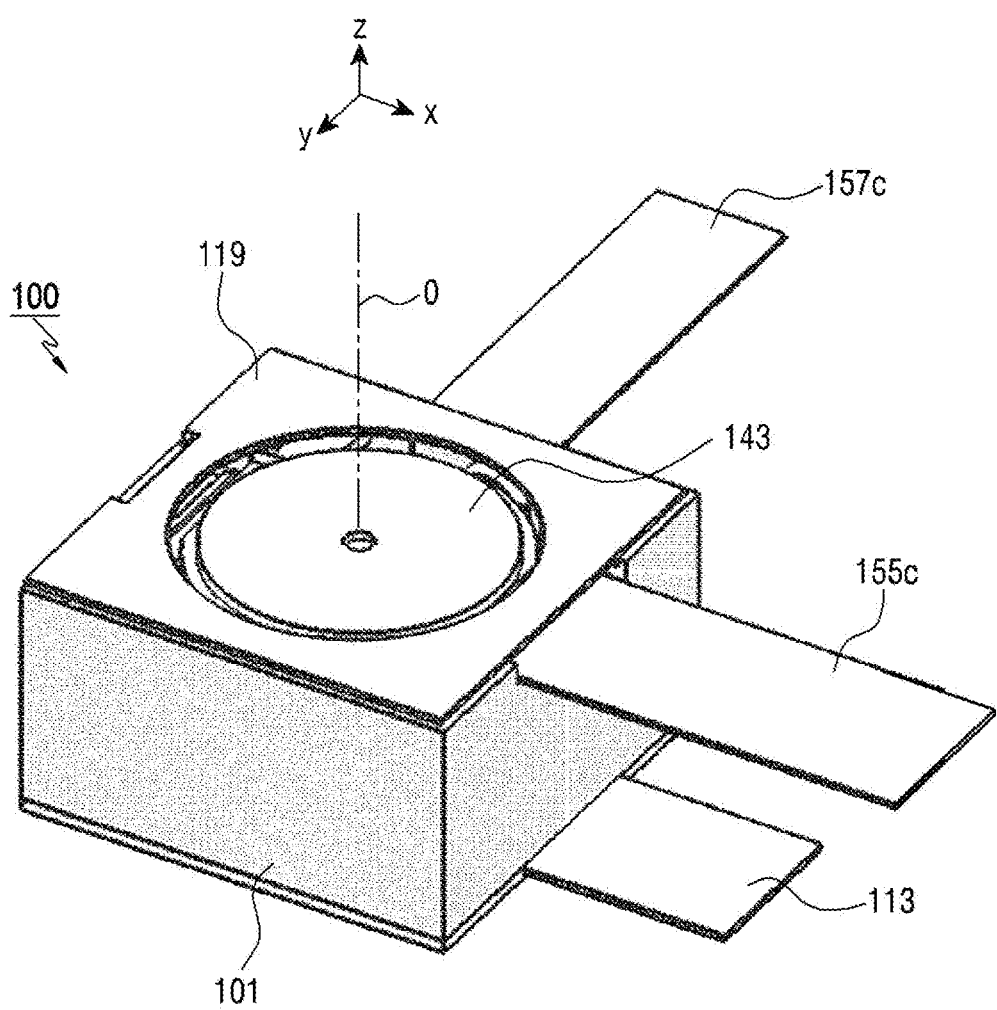
FIG. 1 is a perspective view illustrating a camera lens assembly according to an embodiment of the present disclosure.
Figure 4:
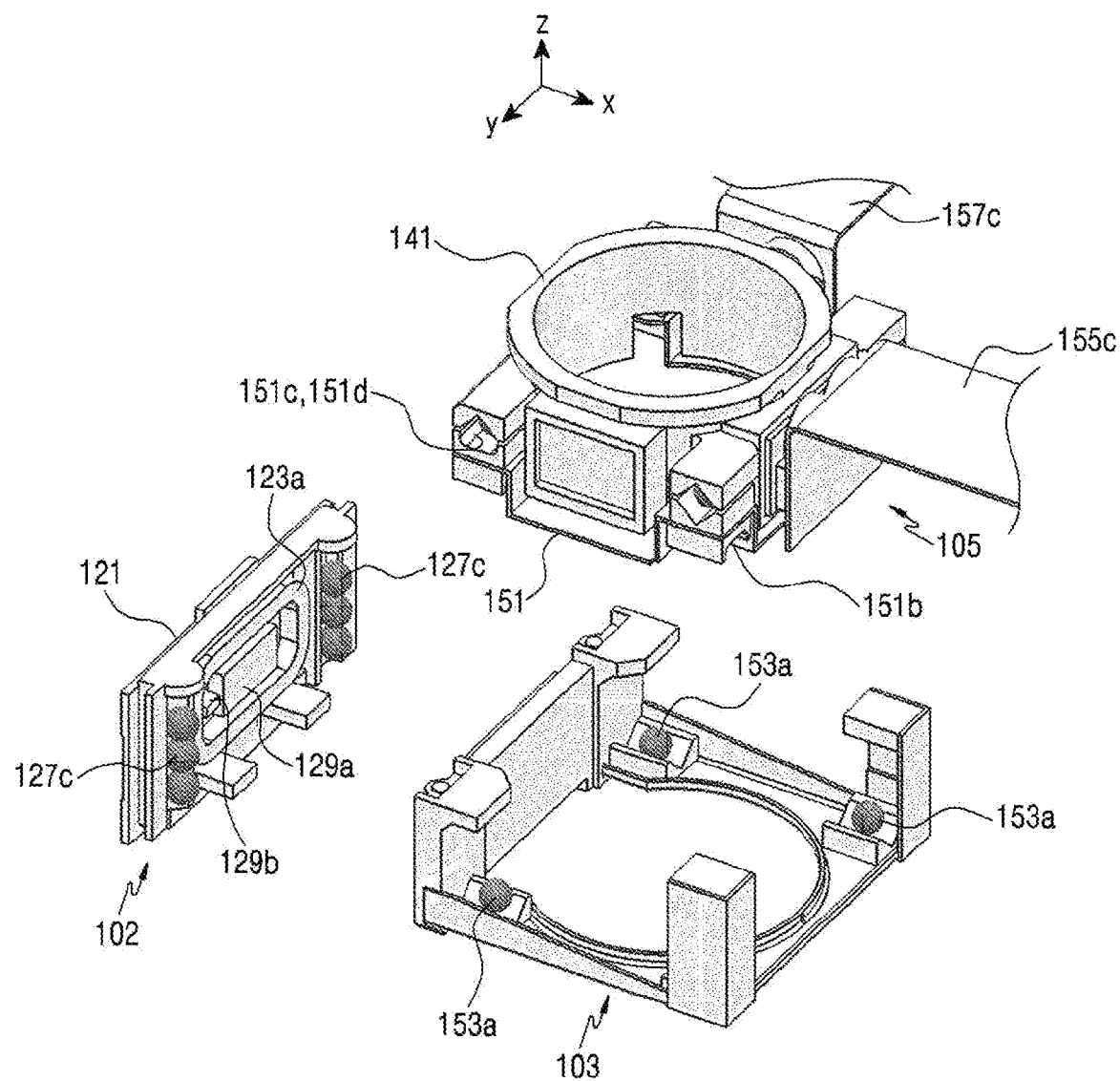
FIG. 4 is a perspective view illustrating a camera lens assembly according to an embodiment of the present disclosure in a state in which a part of the camera lens assembly is disassembled.
Figure 5:
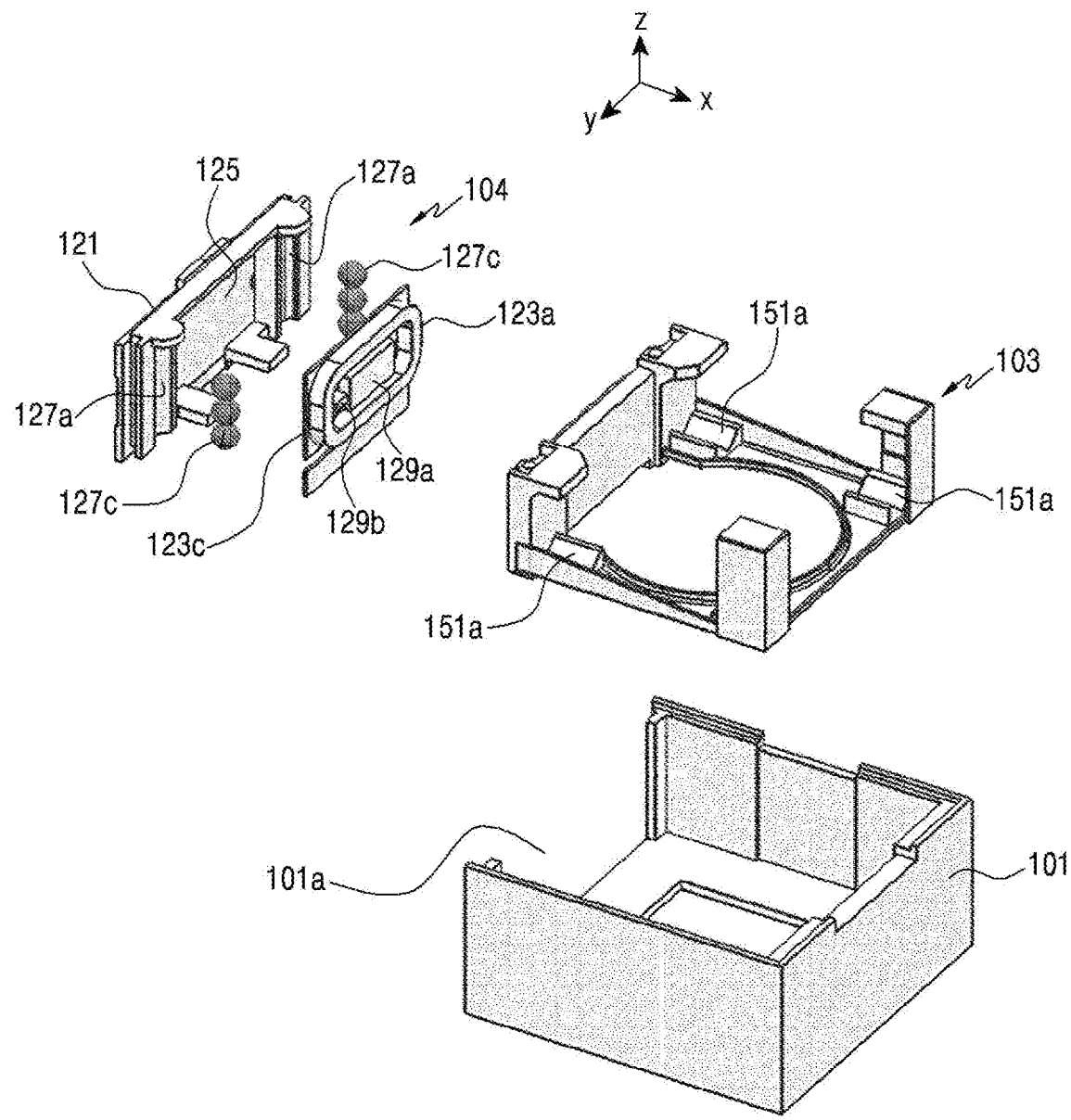
FIG. 5 is a perspective view illustrating a part of a camera lens assembly according to an embodiment of the present disclosure in a state in which a part of the camera lens assembly is disassembled.
Figure 6:
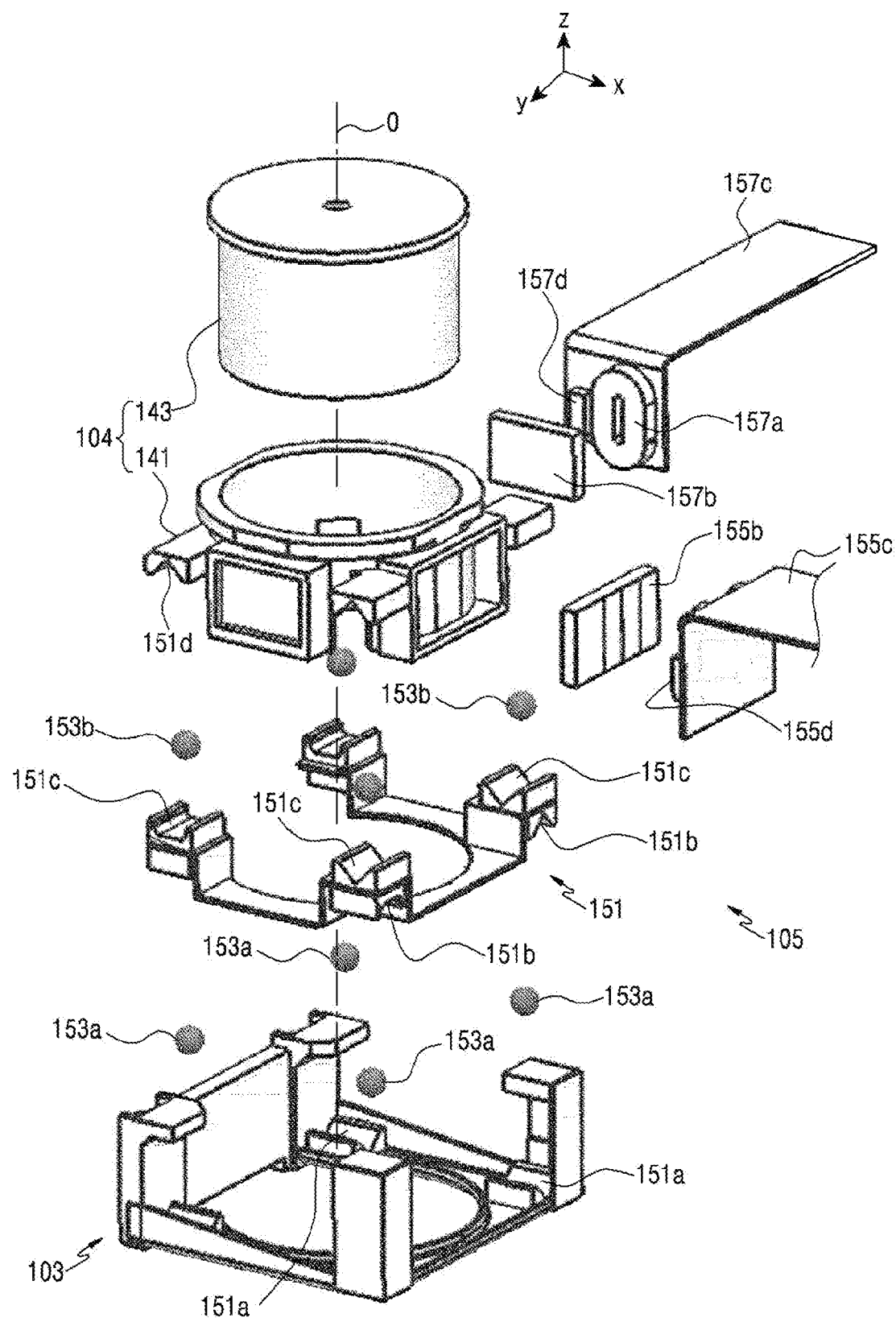
FIG. 6 is a perspective view illustrating a part of a camera lens assembly according to an embodiment of the present disclosure in a state in which another part of the camera lens assembly is disassembled.
Figure 7:
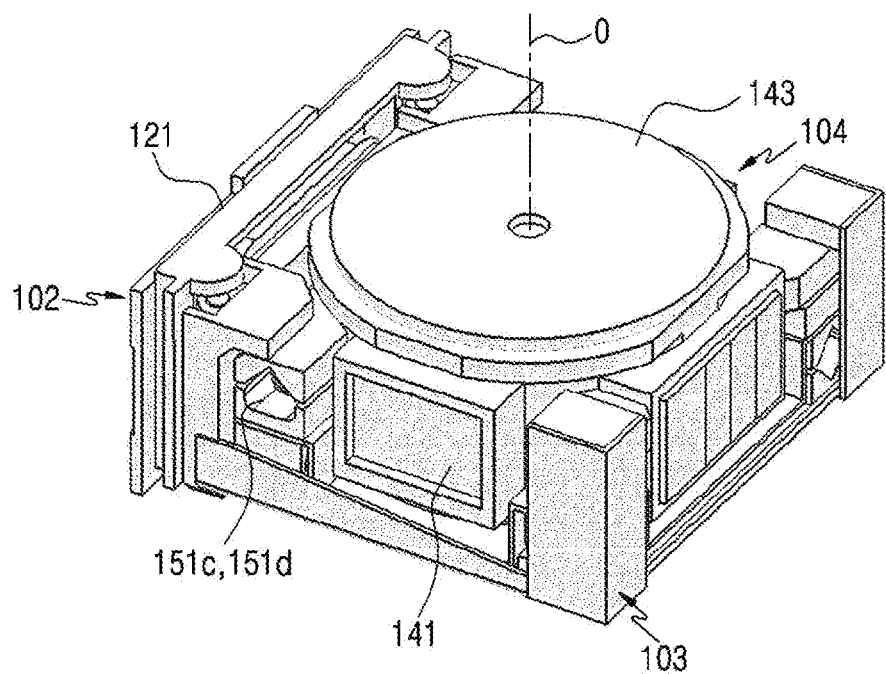
FIG. 7 is a perspective view illustrating a principal part of a camera lens assembly according to an embodiment of the present disclosure.

FIG. 1 is a perspective view illustrating a camera lens assembly according to an embodiment of the present disclosure, Further, FIG. 4 is a perspective view illustrating a camera lens assembly according to an embodiment of the present disclosure in a state in which a part of the camera lens assembly is disassembled, FIG. 5 is a perspective view illustrating a part of a camera lens assembly according to an embodiment of the present disclosure in a state in which the part of the camera lens assembly is disassembled, and FIG. 6 is a perspective view illustrating a part of a camera lens assembly according to an embodiment of the present disclosure in a state in which another part of the camera lens assembly is disassembled. FIG. 7 is a perspective view illustrating a principal part of a camera lens assembly according to an embodiment of the present disclosure.

Referring to FIGS. 1 to 7, a camera lens assembly 100 may include a movable AF unit 103 configured to move back and forth in the direction of the optical axis O of the image sensor 111, and a movable OIS unit 104 mounted on the movable AF unit 103 and configured to move back and forth in the direction of the optical axis O together with the movable AF unit 103. The movable OIS unit 104 may be installed to be floatable in a direction orthogonal to the optical axis on the movable AF unit 103, for example, in a plane orthogonal to the optical axis O.

In another embodiment of various embodiments of the present disclosure, the camera lens assembly 100 may include a housing 101 configured to accommodate the image sensor 111, the movable AF unit 103, the movable OIS unit 104, or the like. The housing 101 may be opened at the top thereof to provide a space for assembling the movable AF unit 103 or the like. The image sensor 111 may be installed on the bottom of the housing 101 to face the opened top of the housing 101. The image sensor 111 is mounted on a flexible printed circuit board 113 to be connected to an image processing device of an electronic device equipped with the camera lens assembly 100, for example, a digital camera, a mobile communication terminal, and a tablet Personal Computer (PC). The camera lens assembly 100 may further include a cover member 119 configured to cover the opened top of the housing 101. After the movable AF unit 103 or the like is installed in the housing 101, the cover member 119 may close the housing 101 so as to protect the internal space of the housing 101. Further, the housing 101 may be configured in a construction in which one side 101a is opened. At the opened side of the housing 101, an AF driving unit 102 may be installed in which the AF driving unit 102 is configured to move the movable AF unit 103 back and forth in the direction of the optical axis O.

The AF driving unit 102 may include a guide structure configured to guide the back-and-forth movement of the movable AF unit 103, and a voice coil motor structure configured to generate a driving force. For example, at the opened side 101a of the housing 101, a guide member 121 may be mounted to guide the back-and-forth movement of the movable AF unit 103. In order to ensure the smooth back-and-forth movement of the movable AF unit 103, a plurality of balls 127c may be interposed between the guide member 121 and the movable AF unit 103. The balls 127c may enable the movable AF unit 103 to move back and forth smoothly by rolling between the guide member 121 and the movable AF unit 103.

The AF driving unit 102 may be provided with guide slots 127a and 127b so as to limit the floating of the movable AF unit 103 in a direction other than the direction of the optical axis O. The guide slots 127a and 127b may be formed in at least one of the guide member 121 and the movable AF unit 103 to extend along the direction of the optical axis O and may have a V-shaped cross-section. In the configuration of the camera lens assembly 100, it is exemplified that the guide slots 127a and 127b are formed in the guide member 121 and the movable AF unit 103, respectively. Some of the balls 127c may be disposed in the guide slot 127a formed in the guide member 121 and the others may be disposed in the guide slot 127b formed in the movable AF unit 103. When the diameter of the balls 127c is set at a proper size, it is possible to secure a gap between the guide member 121 and the movable AF unit 103 even if each of the balls 127c is partially accommodated in the guide slots 127a, 127b. Thus, it is possible to prevent the guide member 121 and the movable AF unit 103 from directly contacting each other and the back-and-forth movement of the movable AF unit 103 may be conducted more smoothly.

The voice coil motor may be provided between the guide member 121 and the movable AF unit 103 so as to provide a driving force of the back-and-forth movement of the movable AF unit 103. The opposite sides of the guide member 121 and the movable AF unit 103 may be provided with a coil 123a and a magnet 123b. For example, the guide member 121 is equipped with the coil 123a and the movable AF unit 103 is equipped with the magnet 123b to be positioned to face the coil 123a. When a signal is applied to the coil 123a through another flexible printed circuit board 123c (see FIG. 5), an electromagnetic force generated between the coil 123a and the magnet 123b may move the movable AF unit 103 back and forth in the direction of the optical axis O.

In various embodiments of the present disclosure, the guide member 121 may be equipped with a yoke 125. The yoke 125 may be disposed to face the magnet 123b with the coil 123a being interposed therebetween. When the yoke 125 is disposed, the electromagnetic force between the coil 123a and the magnet 123b is concentrated so that the efficiency of the voice coil motor may be enhanced. Further, the movable AF unit 103 may have a tendency to come into close contact with the guide member 121 by the attractive force between the magnet 123b and the yoke 125. At this time, since the balls 127c are interposed between the guide member 121 and the movable AF unit 103, the smooth back-and-forth movement of the movable AF unit 103 can be maintained.

The AF driving unit 102 may include a driving circuit unit 129a and a position detecting sensor 129b which detects the displacement and position of the movable AF unit 103. According to an embodiment, the position detecting sensor 129b may be integrated into the driving circuit unit 129a. The position detecting sensor 129b may be configured by a hall sensor. Alternatively, the position detecting sensor 129b may be configured using an optical or mechanical encoder, or the like. The driving circuit unit 129a may apply a driving signal for auto focusing to the coil 123a based on auto focusing state information provided through a separate path, position information of the movable AF unit 103 detected by the position detecting sensor 129b, and the like.

The movable OIS unit 104 is positioned on the movable AF unit 103 and may horizontally move in any of first and second directions X and Y in a plane orthogonal to the optical axis O. At this time, the first and second directions X and Y may be set to directions which are orthogonal to each other and orthogonal to the optical axis O, respectively. The movable OIS unit 104 may be provided with a lens unit 143 including at least one lens and a carrier 141 which accommodates the lens unit 143. Since the movable OIS unit 104 is disposed on the movable AF unit 103, the movable OIS unit 104 may move back and forth in the direction of the optical axis O together with the movable AF unit 103.

An OIS driving unit 105 may be disposed in the housing 101 in which the OIS driving unit 105 may cause the movable OIS unit 104 to move horizontally in a plane orthogonal to the optical axis O, for example, to float in the first and second directions X and Y. The OIS driving unit 105 may include a guide structure configured to guide and support the floating of the movable OIS unit 104 and a voice coil motor structure configured to generate a driving force.

The OIS driving unit 105 may be provided with a second guide member 151 configured to guide and support the floating of the movable OIS unit 104, and other balls 153a and 153b. The second guide member 151 is disposed on the movable AF unit 103 to be capable of floating in the first direction X. Some of the balls 153a, 153b, for example, the balls indicated by reference numeral "153a" are disposed between the second guide member 151 and the movable AF unit 103 to enable the second guide member 151 to float smoothly. When the second guide member 151 floats in the first direction X, the balls 153a may enable the second guide member 151 to float smoothly by rolling.

According to the various embodiments of the present disclosure, the OIS driving unit 105 may be provided with first floating grooves 151a and 151b in order for the second guide member 151 to float in the first direction X in relation to the movable AF unit 103. The first floating grooves 151a and 151b may be formed in at least one of the movable AF unit 103 and the second guide member 151. In the illustrated embodiment, the first floating grooves 151a and 151b are formed and disposed in each of the movable AF unit 103 and second guide member 151 to face each other. The first floating grooves formed in each of the movable AF unit 103 and the second guide member 151 may be formed as V-shaped grooves which extend in the first direction X to be spaced apart from each other.

The balls 153a may be accommodated in the first floating grooves 151a, 151b between the movable AF unit 103 and the second guide member 151. The second guide member 151 may float in the first direction X in relation to the movable AF unit 103 by being guided by the plural first floating grooves 151a, 151b and the balls 153a. In the present embodiment, a certain gap may be secured between the movable AF unit 103 and the second guide member 151 by fabricating the balls 153a in a proper size. For example, while some of the balls 153a are accommodated in the first floating groove 151a formed in the movable AF unit 103 and some other balls 153a may be accommodated in the first floating groove 151b formed in the second guide member 151, at least some of the balls 153a may not be accommodated in any of the first floating grooves 151a and 151b. By designing and fabricating the balls 153a in a proper size, the second guide member 151 may be prevented from directly contacting with the movable AF unit 103 and the second guide member 151 may float in the first direction X more smoothly.

In order to make the movable OIS unit 104 float in the second direction Y, the OIS driving unit 105 may be provided with balls 153b interposed between the carrier 141 and the second guide member 151. When the carrier 141 floats in the second direction Y in relation to the second guide member 151, the balls 153b may enable the carrier 141 to float smoothly by rolling between the second guide member 151 and the carrier 141.

According to the various embodiments of the present disclosure, in order to make the carrier 141 float in the second direction Y in relation to the second guide member 151, the OIS driving unit 105 may be provided with second floating grooves 151c and 151d. The second floating grooves 151c and 151d may be formed in at least one of the carrier 141 and the second guide member 151. In the illustrated embodiment, the second floating grooves 151c and 151d may be formed in each of the carrier 141 and the second guide member 151 to face each other. The second floating grooves 151c and 151d formed in each of the carrier 141 and the second guide member 151 may be formed in V-shaped grooves which are spaced apart from each other.

Between the carrier 141 and the second guide member 151, each of the balls 153b may be accommodated in any of the second floating grooves 151c, 151d. The carrier 141 may float in the second direction Y by being guided by the plural second floating grooves 151c and 151d and the balls 153b. In the present embodiment, a certain gap may be secured between the carrier 141 and the second guide member 151 by fabricating the balls 153b in a proper size. For example, while some of the balls 153b are accommodated in the second floating groove 151d formed in the carrier 141 and some other balls 153b are accommodated in the second floating groove 151c formed in the second guide member 151, at least some of the balls 153b may not be accommodated in any of the second floating grooves 151c and 151d. By designing and fabricating the balls 153b to have a proper size, in the movable OIS unit 104, for example, the carrier 141 may be prevented from directly contacting with the second guide member 151 and the movable OIS unit 104 may float in the second direction Y more smoothly.

When the camera lens assembly 100 is provided with another voice coil motor, a driving force for causing the movable OIS unit 104 to float in a plane orthogonal to the direction of the optical axis O, for example, along the first and second directions X and Y may be provided.

At least two sides of the movable AF unit 103 are opened, and the movable AF unit 103 may be disposed within the housing 101 such that the two opened sides face the first and second directions X and Y, respectively. Some of the sides of movable OIS unit 104, for example, the sides of the carrier 141 may face inner walls of the housing 101 through the opened sides of the movable AF unit 103. On the sides of the carrier 141, first and second magnets 155b and 157b are mounted, respectively, to be capable of facing the inner walls of the housing 101 in the first and second directions X and Y In addition, on the inner walls of the housing 101, first and second coils 155a and 157a may be mounted and positioned to face the first and second magnets 155b and 157b, respectively. The first and second coils 155a and 157a may receive a driving signal through other flexible printed circuit boards 155c and 157c, respectively.

When a signal is applied to the first coil 155a facing the first magnet 155b, the movable OIS unit 104 may float in the first direction X by an electromagnetic force between the first magnet 155b and the first coil 155a. According to the present embodiment, when a signal is applied to the first coil 155a according to, for example, a driving signal or the winding direction of the first coil 155a, the movable OIS unit 104 may also float in the second direction Y.

When a signal is applied to the second coil 157a facing the second magnet 157b, the movable OIS unit 104 may float in the second direction Y by the electromagnetic force between the second magnet 157b and the second coil 157a. When a signal is applied to the second coil 157a according to the winding direction of the second coil 157a or a driving signal, the movable OIS unit 104 may float in the first direction Y.

The OIS driving unit 105 may be provided with second position detecting sensors 155d and 157d configured to detect the displacement and position of the movable OIS unit 104. Since the movable OIS unit 104 may float in at least two directions, for example, the first and second directions X and Y, the OIS driving unit 105 may be provided with a plurality of second position detecting sensors 155d and 157d. In the illustrated embodiment, the OIS driving unit 105 includes second position detecting sensors 155d and 157d which are disposed adjacent to the first and second coils 155a, 157a, respectively. Each of the second position detecting sensors 155d and 157d may be configured by a hall sensor. Alternatively, the second position detecting sensors 155d and 157d may be configured using an optical or mechanical encoder or the like. Based on vibration information, for example, information related to an amount and direction of hand shaking, which is detected through an angular velocity sensor or the like equipped in an electronic device, the position information of the movable OIS unit 104 detected by the second position detecting sensors 155d and 157d, a driving signal for optical image stabilization may be applied to each of the first and second coils 155a and 157a.

As described above, the camera lens assembly according to various embodiments of the present disclosure may implement stable auto focusing and optical image stabilization with a simple configuration by disposing the movable OIS unit 104 for optical image stabilization in the movable AF unit for auto focusing.

Figure 8:
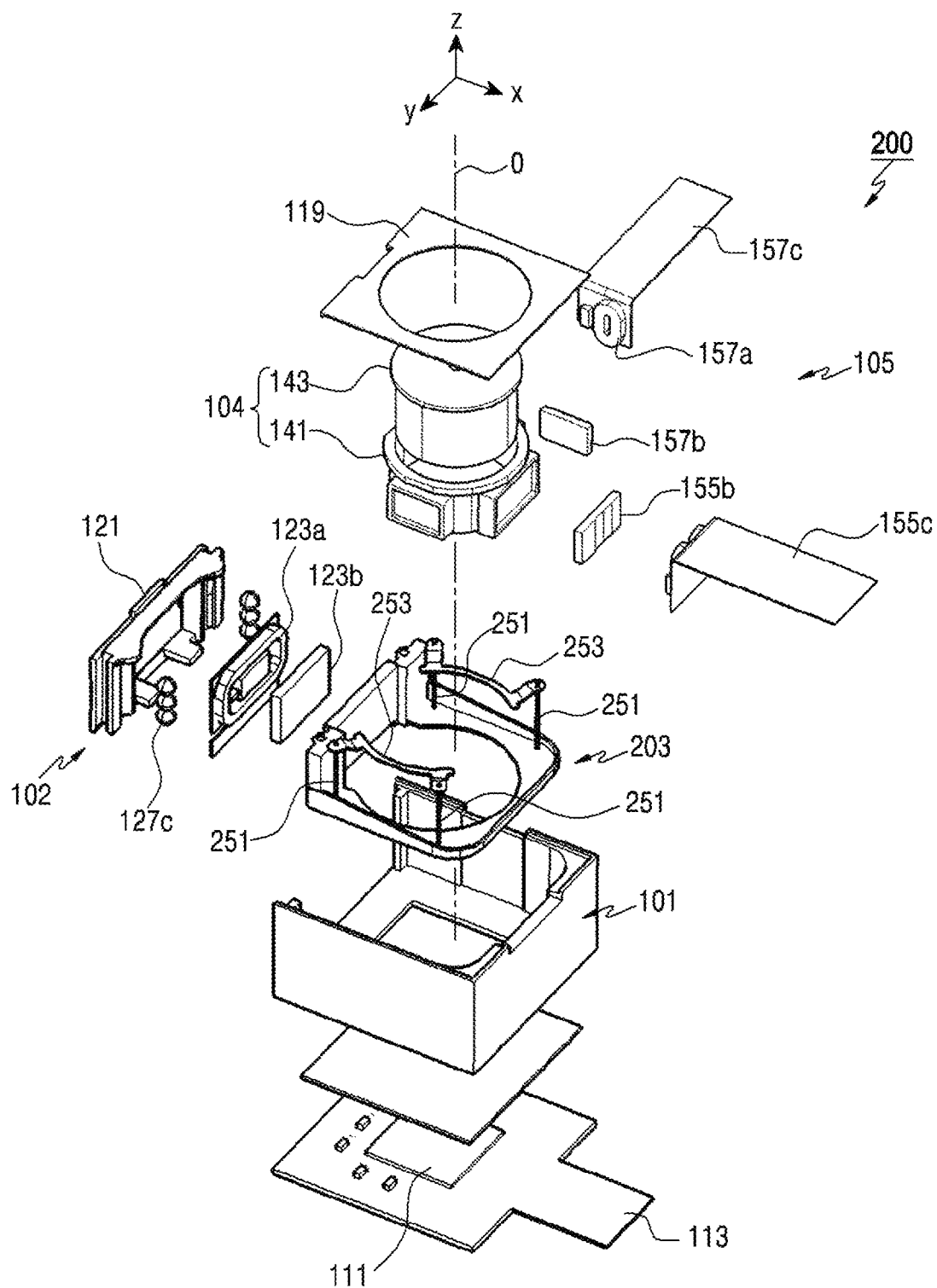
FIG. 8 is an exploded perspective view illustrating a camera lens assembly according to an embodiment of the present disclosure.
Figure 9:
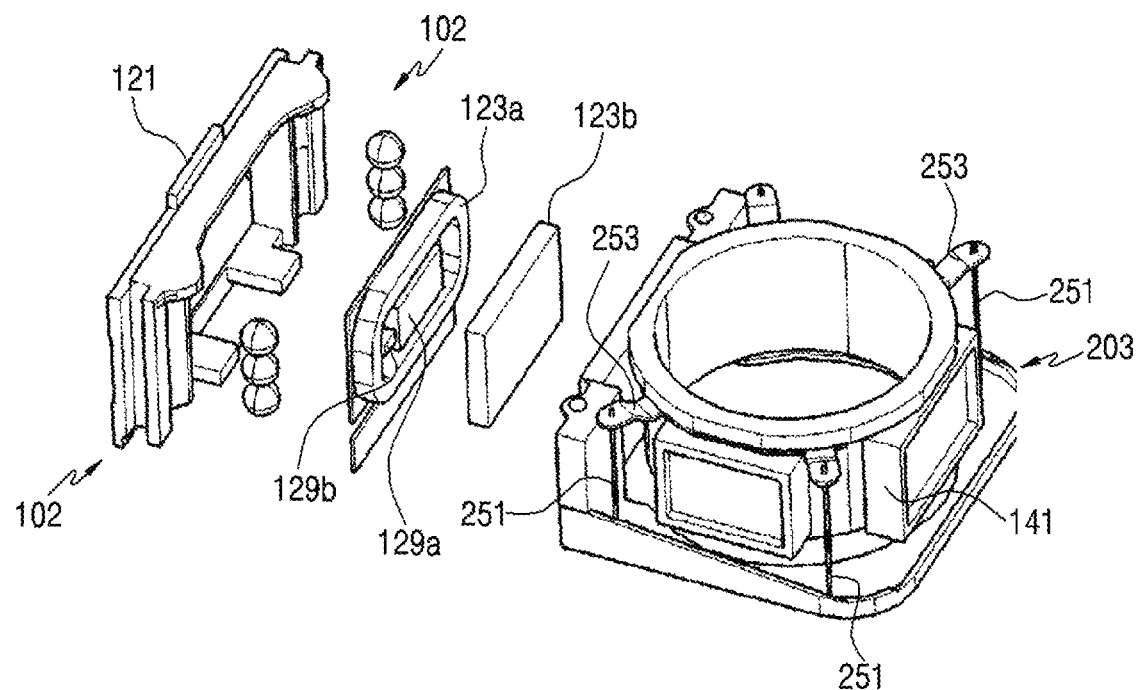
FIG. 9 is a perspective view illustrating a camera lens assembly according to an embodiment of the present disclosure in a state in which a part of the camera lens assembly is disassembled.
Figure 10:
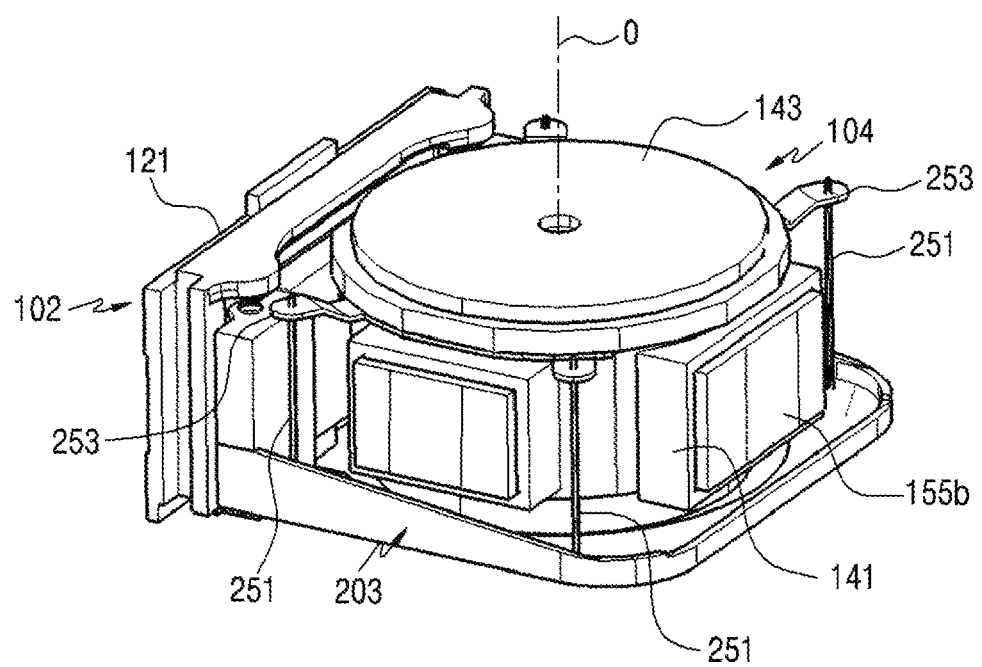
FIG. 10 is a perspective view illustrating a principal part of a camera lens assembly according to an embodiment of the present disclosure.
Figure 11:
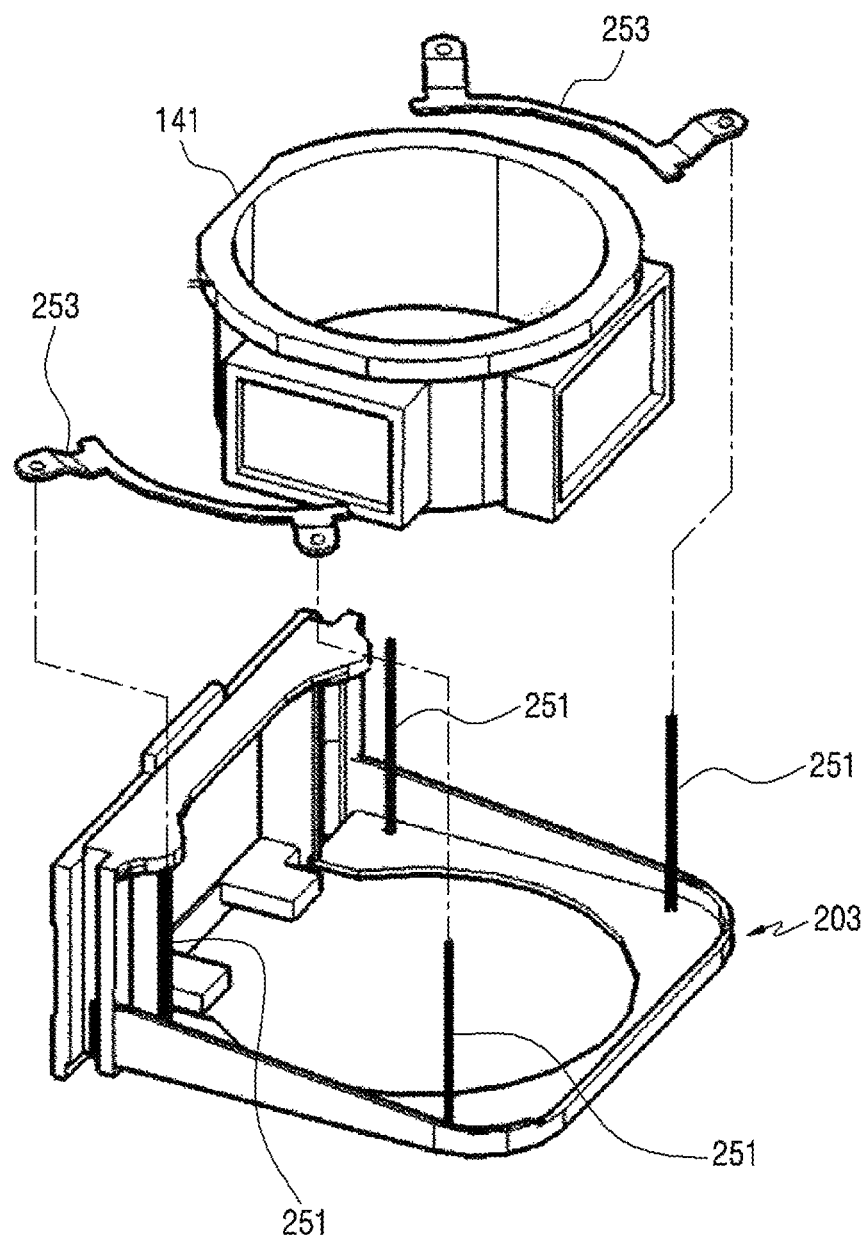
FIG. 11 is a perspective view illustrating a camera lens assembly according to an embodiment of the present disclosure in a state in which a part of the camera lens assembly is disassembled.

FIG. 8 is an exploded perspective view illustrating a camera lens assembly according to an embodiment of the present disclosure, FIG. 9 is a perspective view illustrating a camera lens assembly according to an embodiment of the present disclosure in a state in which a part of the camera lens assembly is disassembled, and FIG. 10 is a perspective view illustrating a principal part of a camera lens assembly according to an embodiment of the present disclosure. In addition, FIG. 11 is a perspective view illustrating a camera lens assembly according to an embodiment in a state in which a part of the camera lens assembly is disassembled.

Referring to FIGS. 8 and 9, a camera lens assembly 200 may include a movable AF unit 203 configured to move back and forth in the direction of the optical axis O of an image sensor 111, and a movable OIS unit 104 disposed on the movable AF unit 203. The movable OIS unit 104 may move back and forth in the direction of the optical axis O together with the movable AF unit 203 and may also float in a plane orthogonal to the optical axis O. For example, the movable OIS unit 104 may float in each of the first and second directions X and Y which are orthogonal to the optical axis O. Further, the first and second directions X and Y may be set to the directions which are orthogonal to each other.

The configuration of the camera lens assembly 200 is similar to that in the embodiment illustrated in FIGS. 1 to 7 but has a difference in a guide structure for guiding optical image stabilization. Accordingly, in describing the camera lens assembly 200, it shall be noted that for the elements which may be readily understood through the descriptions of the preceding embodiment, the same reference numerals may be assigned or omitted, and the descriptions thereof may also be omitted.

The camera lens assembly 200 may be provided with at least one wire 251 in order to install the movable OIS unit 104 on the movable AF unit 203 to be floatable. The camera lens assembly 200 is provided with two pairs of wires 251 each of which may extend in the direction of the optical axis O from the movable AF unit 203. The wires 251 are disposed to be spaced apart from each other, and the ends of the wires 251 are fixed to the movable OIS unit 104, respectively. The movable OIS unit 104 may float in a plane orthogonal to the direction of the optical axis O by electromagnetic forces which are generated between the first and second coils 155a and 155b and the first and second magnets 155b and 157b, respectively, while being supported by the wires 251.

In various embodiments of the present disclosure, the camera lens assembly 200 may be provided with brackets 253 so as to support the wires 251 to the movable OIS unit 104. The brackets 253 may be fixed to a pair of the wires 251, respectively. For example, one end of each bracket 253 may be fixed to one of the wires 251 and the other end may be fixed to the other one of the wires 251. When the opposite side edges of the carrier 141 are fixed to the brackets 253, respectively, the movable OIS unit 104 may be assembled to the movable AF unit 203 to be floatable while being supported by the wires 251.

In various embodiments of the present disclosure, the wires 251 may have an elastic restoring force. Unless a driving signal is applied to the first and second coils 155a and 157b, the movable OIS unit 104 may be returned to an initial position, for example, a position set after the camera lens assembly 200 was assembled by the elastic restoring force of the wires 251. In addition, when the camera lens assembly 200 starts driving, the position of the movable OIS unit 104 may be detected using the position detecting sensors provided in the OIS driving unit 105 which drives the movable OIS unit and a driving signal which moves the movable OIS unit 104 may be applied to the first and second coils 155a and 157b.

Figure 12:
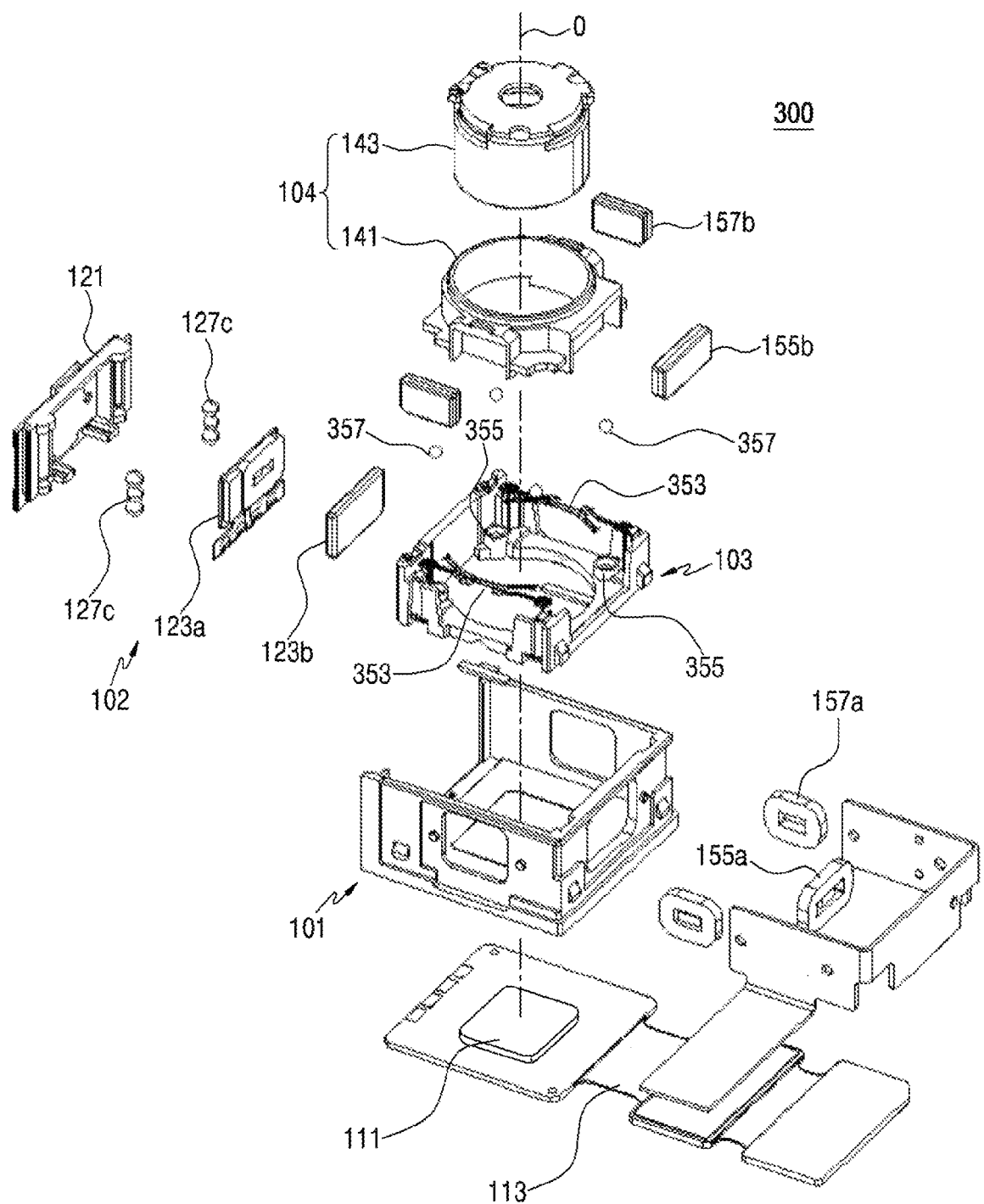
FIG. 12 is an exploded perspective view illustrating a camera lens assembly according to an embodiment of the present disclosure.
Figure 13:
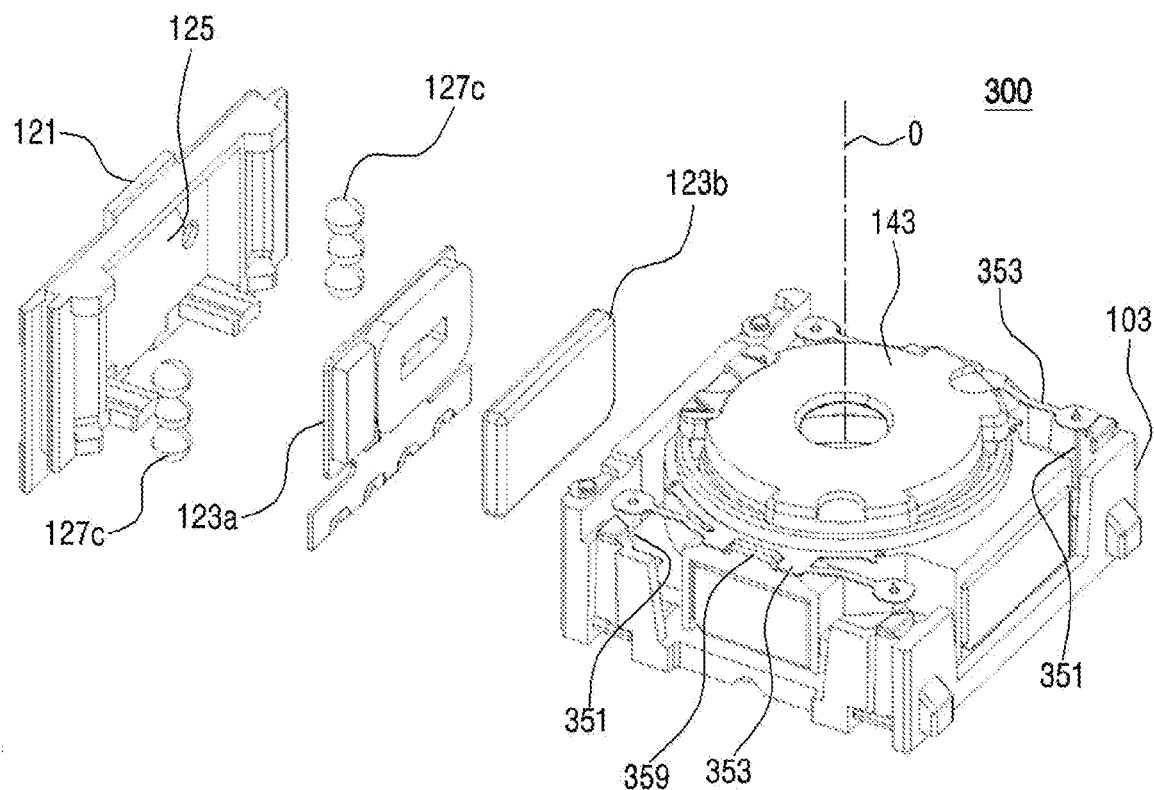
FIG. 13 is a perspective view illustrating a camera lens assembly according to an embodiment of the present disclosure in which a part of the camera lens assembly is disassembled.
Figure 14:
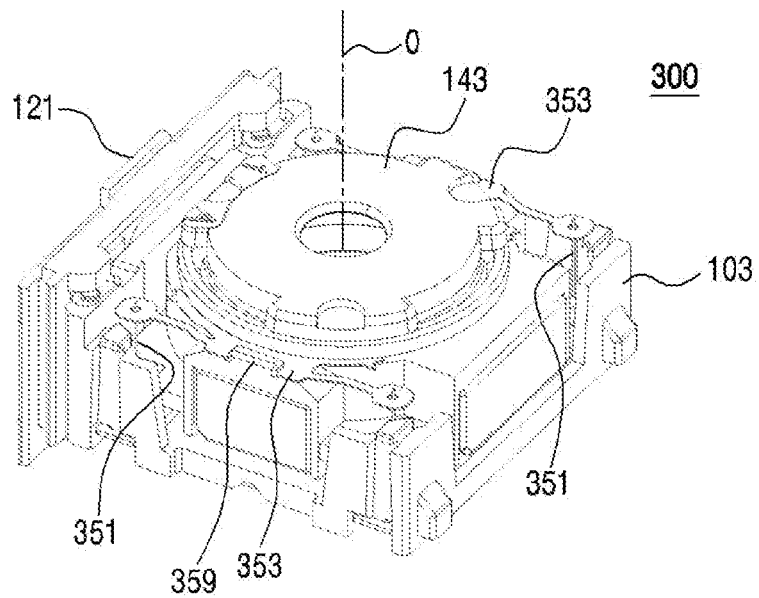
FIG. 14 is a perspective view illustrating a principal part of a camera lens assembly according to an embodiment of the present disclosure.
Figure 15:
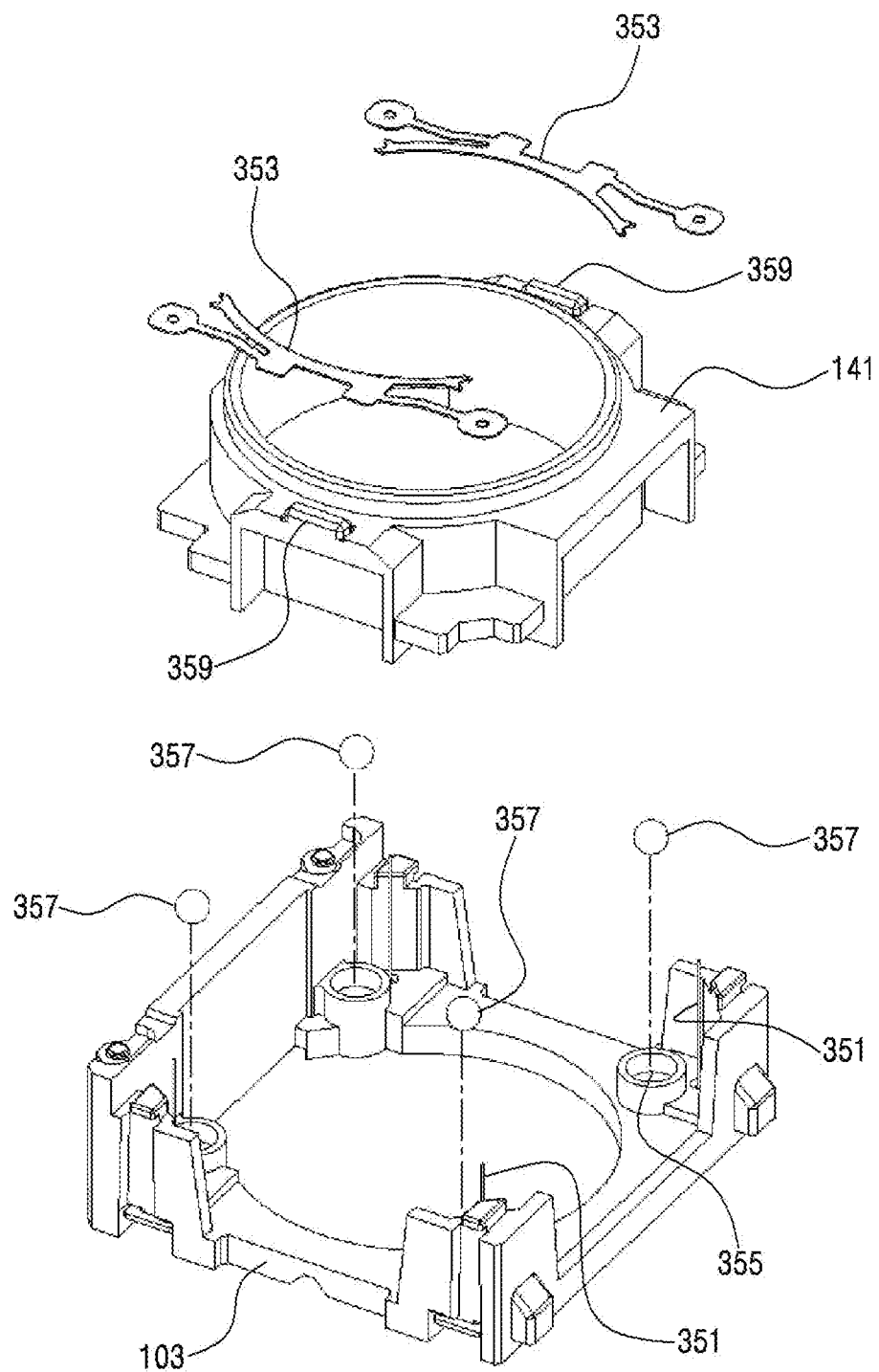
FIG. 15 is a perspective view illustrating a camera lens assembly according to an embodiment of the present disclosure in which a part of the camera lens assembly is disassembled.
Figure 16:
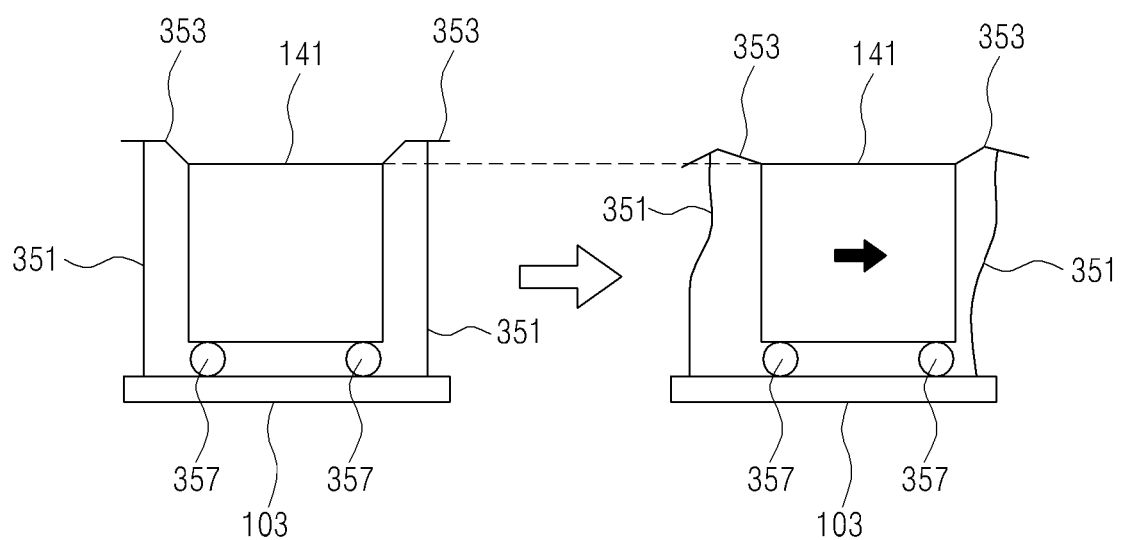
FIG. 16 illustrates an operation of an Optical Image Stabilization (OIS) driving unit accoding to an embodiment of the present disclosure.

FIG. 12 is an exploded perspective view illustrating a camera lens assembly according to an embodiment of the present disclosure. FIG. 13 is a perspective view illustrating a camera lens assembly according to an embodiment of the present disclosure in which a part of the camera lens assembly is disassembled. FIG. 14 is a perspective view illustrating a principal part of a camera lens assembly according to an embodiment of the present disclosure. FIG. 15 is a perspective view illustrating a camera lens assembly according to an embodiment of the present disclosure in which a part of the camera lens assembly is disassembled. FIG. 16 illustrates an operation of an OIS driving unit accoding to an embodiment of the present disclosure.

In the description of the camera lens assembly according to embodiments of the present disclosure, use and functionality of the components may be similar to those in the previous embodiments of the present disclosure and may be assigned the same reference numerals or no reference numeral, and the descriptions thereof may be omitted.

Referring to FIGS. 12, 13, 14, and 15, a camera lens assembly 300 is similar to those of the previous embodiments of the present disclosure in that the camera lens assembly 300 is provided with one or more wires 351 to install the movable OIS unit 104 to the movable AF unit 103 to be floatable. However, because one or more balls 357 are arranged between the movable OIS unit 104 and the movable AF unit 103, optical image stabilization may be smoothly performed and it may be possible to prevent a position of the lens unit 143 in the direction of optical axis O, for example, a focused state, from being changed due to the optical image stabilization.

The movable AF unit 103 accommodates at least a part of the movable OIS unit 104, for example, the carrier 141 which may be coupled to the movable AF unit 103 through the wires 351 to be floatable. The carrier 141 may perform the optical image stabilization while being supported by the wires 351 and floating in a direction perpendicular to the optical axis O of the lens unit 143 in response to the operation of the OIS driving unit 105.

In an embodiment of the present disclosure, four wires 351 may be arranged at regular intervals. One end of each of the wires 351 is supported on the movable AF unit 103 and the other end may be supported on the carrier 141. In order to support the other ends of the wires 351 on the carrier 141, the camera lens assembly 300 may further include brackets 353. The brackets 353 may be fixed to the other ends of the wires 351 as well as the carrier 141. In order to fix the brackets 353, the carrier 141 may be formed with a plurality of fixing protrusions 359. In an embodiment of the present disclosure, an adhesive, a double-sided adhesive tape, and the like, may be used to fix the brackets 353.

The brackets 353 may be connected with the wires 351 by a joint structure. For example, the brackets 353 may be rotated within an angular range in relation to the wires 351. In addition, the brackets 353 may be made of an elastic member, for example, a leaf spring. As will be described below, when the brackets 353 are made of an elastic member or connected to the wires 351 through a joint structure, it is possible to prevent a focused state from being changed due to optical image stabilization.

Three or four balls 357 may be interposed between the carrier 141 and the movable AF unit 103. In order to limit a range in which the balls 357 are movable on the movable AF unit 103, driving holes 355 may be provided on the movable AF unit 103. Each of the balls 357 may be accommodated in one of the driving holes 355 and may rotate or float in the driving hole 355. The driving holes 355 are formed to have a diameter larger than that of the balls 357 so as to enable the balls 357 to float. The driving holes 355 are formed to have a depth which is smaller than the diameter of the balls 357 so that the balls 357 may be at least partially exposed to the outside of the driving holes 355. In order to ensure smooth floating or rotation of the balls 357, a lubricant may be coated on the inner wall of each of the driving holes 355.

The portions of the balls 357 exposed from the driving holes 355 are in point-contact with the carrier 141 and allows the carrier 141 to smoothly float at the time of optical image stabilization. In addition, the balls 357 may suppress a tilting phenomenon by which the carrier 141 and the lens unit 143 move in the optical axis O direction or the optical axis O direction to be slanted in relation to the optical axis direction of the image sensor 111.

Referring to FIG. 16, the carrier 141 is connected to the movable AF unit 103 through the wires 351 and the brackets 353, and the balls 357 are interposed between the movable AF unit 103 and the carrier 141. Here, the wires 351 and the brackets 353 or the connection structure between the wires 351 and the brackets 353 may provide an elastic force in a direction of forcing the carrier 141 to tightly contact with the movable AF unit 103. In addition, because the balls 357 are interposed between the carrier 141 and the movable AF unit 103, the carrier 141 and the lens unit 143 may remain at a certain height in relation to the movable AF unit 103 in the optical axis O direction.

When performing the optical image stabilization, the movable OIS unit 104 floats in a direction perpendicular to the optical axis O. Thus, the height from the movable AF unit 103 to the other ends of the wires 351 may be changed according to the optical image stabilization. The change of the height to the other ends of the wires 351 may be compensated when the brackets 353 are deformed or rotated to be slanted in relation to the wires 351. Accordingly, even when performing the optical image stabilization, the carrier 141 and the lens unit 143 may remain at a certain height in relation to the movable AF unit 103.

As described above, the camera lens assembly 300 may suppress a change of a focused state due to optical image stabilization while implementing stable optical image stabilization even in a structure of connecting the movable OIS unit 104 to the movable AF unit 103 using the wires 351.

The camera lens assembly according to various embodiments of the present disclosure may be simplified in construction while implementing both the auto focus function and the optical image stabilization function by disposing the movable OIS unit to be floatable on the movable AF unit. Since the construction is simplified, the camera lens assembly according to the various embodiments may be easily miniaturized and the manufacturing costs may be reduced. Further, due to the simplified construction, the camera lens assembly may be manufactured to be stronger so that damage caused by an impact, such as a drop, may be prevented and the reliability may be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A camera lens assembly comprising:
   an Auto Focus (AF) unit configured to move back and forth in a direction of an optical axis of an image sensor;
   a housing configured to accommodate the AF unit;
   a guide member mounted on the housing;
   a plurality of balls interposed between the guide member and the AF unit; and
   an Optical Image Stabilization (OIS) unit installed on the AF unit and configured to move back and forth in the direction of the optical axis together with the AF unit,
   wherein the OIS unit is configured to float in a direction orthogonal to the optical axis on the AF unit, and
   wherein, when the AF unit is accommodated in the housing and moves back and forth, the plurality of balls roll between the guide member and the AF unit.

2. The camera lens assembly of claim 1, further comprising:
   an AF driving unit provided on the housing,
   wherein the AF unit is configured to move back and forth in the direction of the optical axis direction by the AF driving unit.

3. The camera lens assembly of claim 2,
   wherein the AF driving unit includes,
      a coil mounted on the guide member, and
      a magnet mounted on the AF unit to face the coil, and
   wherein the AF unit is configured to move back and forth according to a signal applied to the coil.

4. The camera lens assembly of claim 3,
   wherein the AF driving unit is further configured to include a guide slot formed in at least one of the guide member and the AF unit and extends along the direction of the optical axis direction, and
   wherein the plurality of balls are disposed in the guide slot.

5. The camera lens assembly of claim 3, wherein the AF driving unit further includes a yoke mounted on the guide member and positioned to face the magnet with the coil being interposed therebetween.

6. The camera lens assembly of claim 3,
   wherein the AF driving unit further includes a sensor configured to detect a position and mounted on the guide member, and
   wherein the AF driving unit is configured to detect a displacement of the AF unit in the direction of the optical axis.

7. A camera lens assembly comprising:
   an Auto Focus (AF) unit configured to move back and forth in a direction of an optical axis of an image sensor;
   an Optical Image Stabilization (OIS) unit installed on the AF unit and configured to move back and forth in the direction of the optical axis together with the AF unit,
   a housing configured to accommodate the AF unit; and
   an OIS driving unit provided on the housing,
   wherein the OIS unit is configured to float in a direction orthogonal to the optical axis on the AF unit,
   wherein the OIS driving unit includes coils mounted on the housing, and magnets mounted on the OIS unit to face the coils, respectively, and
   wherein the OIS unit is configured to float in a direction orthogonal to the optical axis on the AF unit according to a signal applied to at least one of the coils.

8. The camera lens assembly of claim 7, wherein the OIS unit comprises:
   a lens unit including at least one lens; and
   a carrier configured to accommodate the lens unit, and
   wherein the magnets are mounted on the carrier.

9. The camera lens assembly of claim 8,
   wherein, when a signal is applied to a first coil of the coils, the OIS unit is configured to float in a first direction in a plane orthogonal to the optical axis, and
   wherein, when a signal is applied to a second coil of the coils, the OIS unit floats in a second direction in a plane orthogonal to the optical axis, the second direction being orthogonal to the first direction.

10. The camera lens assembly of claim 9,
   wherein the OIS driving unit further includes a second guide member configured to float in the first direction within the AF unit, and
   wherein the carrier is disposed to float in the second direction on the second guide member.

11. The camera lens assembly of claim 10,
   wherein the OIS driving unit further includes a plurality of balls interposed between the AF unit and the second guide member and first floating grooves formed in at least one of the AF unit and the second guide member and extending in the first direction, and wherein the plurality of balls are disposed in any of the first floating grooves.

12. The camera lens assembly of claim 10, wherein the OIS driving unit further includes a plurality of balls interposed between the second guide member and the OIS unit, and second floating grooves formed at least one of the second guide member and the OIS unit and extending in the second direction, and wherein the plurality of balls are disposed in any of the second floating grooves.

13. The camera lens assembly of claim 9, wherein the OIS driving unit further includes a plurality of wires extending from the AF unit along the direction of the optical axis, and wherein the OIS unit floats in the first or second direction while being supported by the wires.

14. The camera lens assembly of claim 13, wherein the OIS driving unit further includes a plurality of brackets fixed to top ends of the wires, and wherein the plurality of brackets are fixed to the carrier.

15. The camera lens assembly of claim 14, wherein the bracket comprises a leaf spring.

16. The camera lens assembly of claim 13, further comprising one or more balls interposed between the AF unit and the OIS unit.

17. The camera lens assembly of claim 16, further comprising:

one or more driving holes formed in the AF unit, wherein each of the balls is accommodated in one of the driving holes is configured to float and is in point-contact with the OIS unit to support the floating of the OIS unit.

18. The camera lens assembly of claim 7, wherein the OIS driving unit further includes a position detecting sensor mounted on the housing and configured to detect a displacement of the OIS unit in the direction orthogonal to the optical axis.

* * * * *